United States Patent
Yunoki et al.

[11] Patent Number: 5,574,904
[45] Date of Patent: Nov. 12, 1996

[54] DATABASE MANAGEMENT SYSTEM IN AN INTELLIGENT NETWORK USING A COMMON REQUEST DATA FORMAT

[75] Inventors: Hideo Yunoki; Yoshihiro Kubota, both of Kawasaki, Japan

[73] Assignee: Fujitsu Limited, Kawasaki, Japan

[21] Appl. No.: 246,479

[22] Filed: May 19, 1994

Related U.S. Application Data

[63] Continuation of Ser. No. 642,894, Jan. 18, 1991, abandoned.

[30] Foreign Application Priority Data

Jan. 19, 1990 [JP] Japan ..................... 2-8415

[51] Int. Cl.⁶ ..................... G06F 12/00; G06F 15/167
[52] U.S. Cl. .............. 395/601; 364/705.05; 364/DIG. 1; 364/282.1; 364/222.2; 364/222.3; 364/239; 364/242.94; 364/284.4
[58] Field of Search ................ 395/600; 364/DIG. 1, 364/705.05

[56] References Cited

U.S. PATENT DOCUMENTS

| | | | |
|---|---|---|---|
| 4,377,859 | 3/1983 | Dunning et al. | 370/58 |
| 4,479,196 | 10/1984 | Ferrer et al. | 364/900 |
| 4,774,655 | 9/1988 | Kollin et al. | 364/200 |
| 4,780,821 | 10/1988 | Crossley | 395/650 |
| 4,956,769 | 9/1990 | Smith | 364/200 |
| 4,982,325 | 1/1991 | Tignor et al. | 364/200 |
| 5,058,000 | 10/1991 | Cox | 395/600 |
| 5,124,909 | 6/1992 | Blakely | 395/200 |
| 5,375,207 | 12/1994 | Blakely et al. | 395/200 |

OTHER PUBLICATIONS

Computer Networks, Andrew Tanenbaum, 1981 pp. 10–17.
Database Computers, Stanley Su, 1988 pp. 330–333.

*Primary Examiner*—Thomas G. Black
*Assistant Examiner*—Jean R. Homere

[57] ABSTRACT

A service control point of an intelligent telephone network has an application interface platform for managing a database and a plurality of service application programs. A translation module analyzes a service request message from an originating subscriber and creates a database processing request corresponding to the content of the service request. A database processing module accesses the database based on the database processing request and requests application processing of a particular service application program. An outputted processing module sends a message to the intelligent telephone network based on an outputted processing request from a one of the service application programs. The application interface platform is provided between the plurality of the service application programs and the database. The database processing, application processing and outputted processing requests between two modules or between a module and a service application program are made in a common data format.

17 Claims, 20 Drawing Sheets

SSP: SERVICE SWITCHING POINT

|   | A | B | C | D | E | F |
|---|---|---|---|---|---|---|
| A | — | O | O | X | pA | X |
|   |   |   |   |   |   |   |
| F |   |   |   |   |   |   |

14 o : NO MUTUAL RESTRICTION IN EFFECT x : SIMULTANEOUS ACCESS DISALLOWED pA: "A" SERVICE PRIORITIZED. ACCORDINGLY "E" SERVICE IGNORED cBC: NO MUTUAL RESTRICTION IN EFFECT UNLESS "B" AND "C" SERVICES BEING SIMULTANEOUSLY ACTIVATED sBC: NO MUTUAL RESTRICTION IN EFFECT IF BOTH "B" AND "C" SERVICES BEING SIMULTANEOUSLY ACTIVATED t(XX) : ONLY DESIGNATED TIME REGARDED AS RESTRICTION OBJECT

Fig. 4

| TAG | 1ST PARAM | 2ND PARAM | 3RD PARAM | 4TH PARAM | 5TH PARAM |
|---|---|---|---|---|---|
| | SERVICE KEY | ORIGINATING NUMBER | CLOSED-USER-GROUP INDEX | DELIMITTER | DESTINATING NUMBER |
| RELAY CONVERSION | CLOSED-USER-GROUP | 7126666 | 090 | ALL "1" | 7125555 |

Fig. 5

| TAB NAME | FUNCTION | EXAMPLE |
|---|---|---|
| RELAY CONVERSION | INFORMATION "B" OBTAINED FROM INFORMATION "A" AND INFORMATION "C" CORRESPONDING TO "B" OBTAINED | CHECK PROCESSING OF CLOSED-USER-GROUP |
| CHECK | CONTENT OF INFORMATION "A" VERIFIED BY INFORMATION "B" | PASSWORD CHECK |
| UPDATE | CONTENT OF DATABASE UPDATED BY INFORMATION "A" | PASSWORD UPDATION |
| OBTAINING | INFORMATION IN DATABASE CORRESPONDING TO INFORMATION "A" AND OBTAINED | SEARCHING REGISTERED MESSAGE |
| COMPARISON | CONTENTS OF DATABASE CORRESPONDING TO INFORMATION "A" AND "B" COMPARED | COMPARISON OF ORIGINATING / DESIGNATING SUBSCRIBER DATA |
| PROCESSING | DATABASE CONTENTS RESPECTIVELY CORRESPONDING TO INFORMATION "A", "B" AND "C" COMPARED AND PROCESSING PERFORMED PER INSTRUCTION OF INFORMATION "D" | THE MAXIMUM VALUE AMONG "A", "B" AND "C" SEARCHED AND OUTPUTTED |
| TIME DESIGNATION UPDATING | UPDATION EXECUTED BY TIME DESIGNATION | ENTIRELY REWRITING |
| TIME DESIGNATION OBTAINING | OBTAINING EXECUTED BY TIME DESIGNATION | TIME DESIGNATED BROADCASTING SERVICE |

Fig. 6

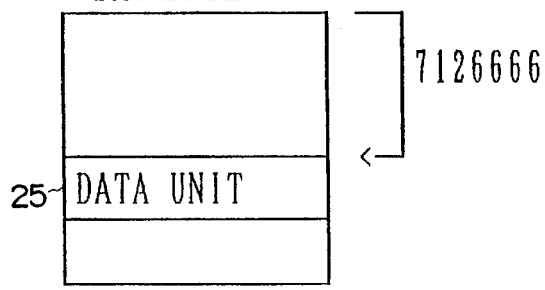
Fig. 8A
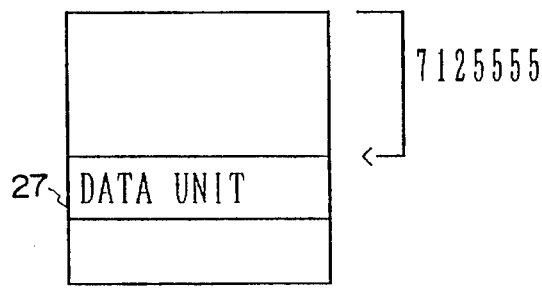
Fig. 8C
| INDEX | INTERLOCK |
|-------|-----------|
|       |           |
| 090   | 12345     |
|       |           |
25 DATA UNIT
Fig. 8B
| INDEX | INTERLOCK |
|-------|-----------|
|       |           |
| 010   | 12345     |
|       |           |
27 DATA UNIT
Fig. 8D

| PROGRAM NUMBER | 1ST ORIGINATING NUMBER | 2ND ORIGINATING CLOSED-USER-GROUP INDEX | 3RD OA DISPLAY | 4TH INTERLOCK | 5TH DESTINATING NUMBER | 6TH DESTINATING INDEX |
|---|---|---|---|---|---|---|
| CUG | 7126666 | 090 | ON | 12345 | 7125555 | 010 |

Fig. 9

| TAG | 1ST PARAM | 2ND PARAM | 3RD PARAM |
|---|---|---|---|
| SENDING INSTRUC- TION | DESTINATING NUMBER | CLOSED-USER -GROUP INDEX | OA DISPLAY |
| | 7125555 | 010 | OFF |

Fig. 11

| TAG | 1ST PARAM | 2ND PARAM | 3RD PARAM | 4TH PARAM | 5TH PARAM |
|---|---|---|---|---|---|
| | DATABASE TYPE | ORIGINATING NUMBER | OBJECT ITEM | OPERATION | UNIT |
| UPDATING | CLOSED-USER-GROUP STATISTICS | 7126666 | NUMBER OF TIMES ACCESSED | ADDING | +1 |

Fig. 12A

| TAG | 1ST PARAM | 2ND PARAM | 3RD PARAM | 4TH PARAM | 5TH PARAM |
|---|---|---|---|---|---|
| | DATABASE TYPE | INTERLOCK | OBJECT ITEM | OPERATION | UNIT |
| UPDATING | CLOSED-USER-GROUP STATISTICS | 12345 | NUMBER OF TIMES ACCESSED | ADDITION | +1 |

Fig. 12B

DATABASE MANAGEMENT SYSTEM IN AN INTELLIGENT NETWORK USING A COMMON REQUEST DATA FORMAT

This is a continuation of application Ser. No. 07/624,894, filed Jan. 18, 1991, now abandoned.

FIELD OF INVENTION

This invention pertains to a method of managing a database in an intelligent network.

DESCRIPTION OF RELATED ART

Various services, such as collect calls, three-way conversations, and telephone conventions, are offered to users of telephone networks.

Generally, service application programs for realizing such services, together with databases for use in such services, are provided in switching centers.

Recently, research has been performed to find a way of separating such service application programs from the exchanging operation and thereby centrally manage them at one point in the network. A communication network that realizes this objective is called an intelligent network. Its purpose is to enable operators of exchange networks to freely create service application programs indepently of the type of exchange machine. Conventionally, creation of such service application programs depends on the type of exchange machine in the switching center.

FIG. 1 shows an example of an intelligent network's configuration. The service switching points 11 are exchange machines for controlling connections between terminals. Each is connected to a device control point (SPC) 12 through a signal network. The object is to concentrate application programs and databases for processing services requested by subscribers in the service control point 12.

However, currently only databases are concentrated, so exchange network operators cannot freely create new service application programs. This is because the service application programs and database management functions are closely linked, making it necessary to comprehend the database structures and the like in developing application programs. This requires special know-how and a huge number of development steps.

Not all the services provided to telephone network users can be activated simultaneously. Such services include a service for activating something prioritized and some services can not be activated concurrently. Therefore, when an originating subscriber requests a plurality of services, the existence of mutual restrictions between services needs to be checked. The required checks are performed in respective application programs. When a new application program is created, existing application programs need to be modified. This lowers efficiency in developing a program.

SUMMARY OF THE INVENTION

This invention purports to enable service application programs for communication networks to be developed without special attention being paid to a database structure.

In one preferred mode, an Application Interface Platform (APIP) is provided between a plurality of service application programs and databases. Access to the database from respective application programs is performed through the application interface platform. Processing requests between each application programs and the application interface platform is performed based on a common data format. The application interface platform comprises a translating module, a database processing module and output processing module.

In an intelligent (communication or telephone) network which integrally controls a plurality of service application programs, the translating module analyzes a service request message from subscriber and creates a database processing request based on the service request message. The database processing module accesses a database and makes an application processing request to a plurality of service application programs, based on the database processing request from the translating module. The database processing module accesses the database based on the database processing request from the service application programs.

The output processing module outputs messages to the communication network based on an output processing request from one of the service application programs. The processing requests, either between two modules or between a module and the service application programs, all have a common data format.

The translating module creates the database processing request, e.g., by adding a processing tag corresponding to the service to each parameter of the received service request message. The database processing module obtains the desired information by accessing the database based on the above database processing request. The database processing module creates an application processing request from the obtained information and each parameter of the service request message. The service application programs designated by this application processing request execute the respective service processing. If the execution result needs to be outputted to the communication network, the service application programs create the output processing request and output it to the output processing module. If the database needs to be accessed as a result of the service execution, the service application programs create tile database processing request in correspondence with the necessary processing content and output the database processing request to the database processing module.

Thus, the service application programs can be configured separately from the database by inserting a translating module, a database processing module and an output processing module either between the communication network and the service application programs or between the database and the service application programs, and by making the processing requests between each module and the service application programs in a common data format.

Accordingly, service application programs can be developed without any special attention being paid to the database structure, thereby improving efficiency in developing the program.

BRIEF DESCRIPTION OF THE DRAWINGS

FIG. 4 explains a mutual restriction matrix table,

FIG. 5 shows an example of a closed-user-group-related database-processing request slip, FIG. 6 explains a processing tag, FIG. 9 shows an example of a closed-user-group-related application-program-processing request slip, FIG. 11 shows an example of the output-processing request slip, FIGS. 12A and 12B show examples of database processing request slips.

DESCRIPTION OF THE PREFERRED EMBODIMENTS

Figure 1:
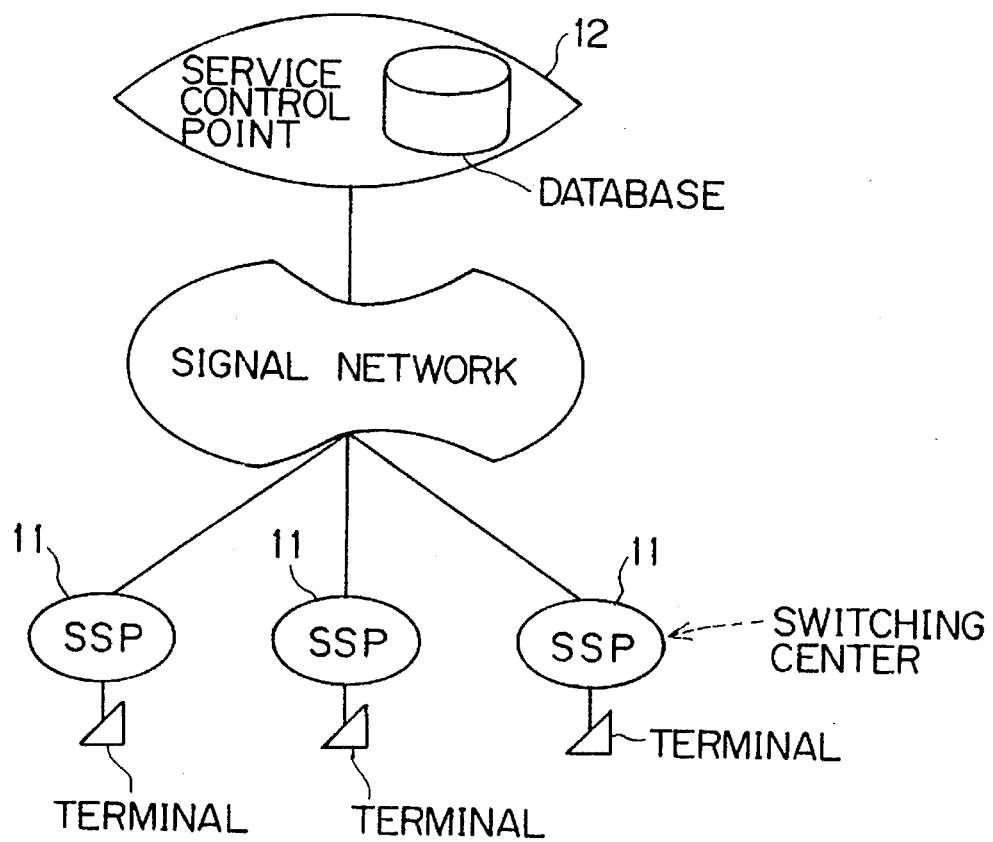
FIG. 1 shows an example of an intelligent network's configuration.

A preferred embodiment of the present invention is explained by referring to the drawings.

The present embodiment pertains to the service control point (SCP) (service control point) 12 for executing the database management method of the present invention.

An intelligent network has the structure shown in FIG. 1. The service control point 12 comprises a database, various service application programs and an application program interface platform 22, to be described later.

Figure 2:
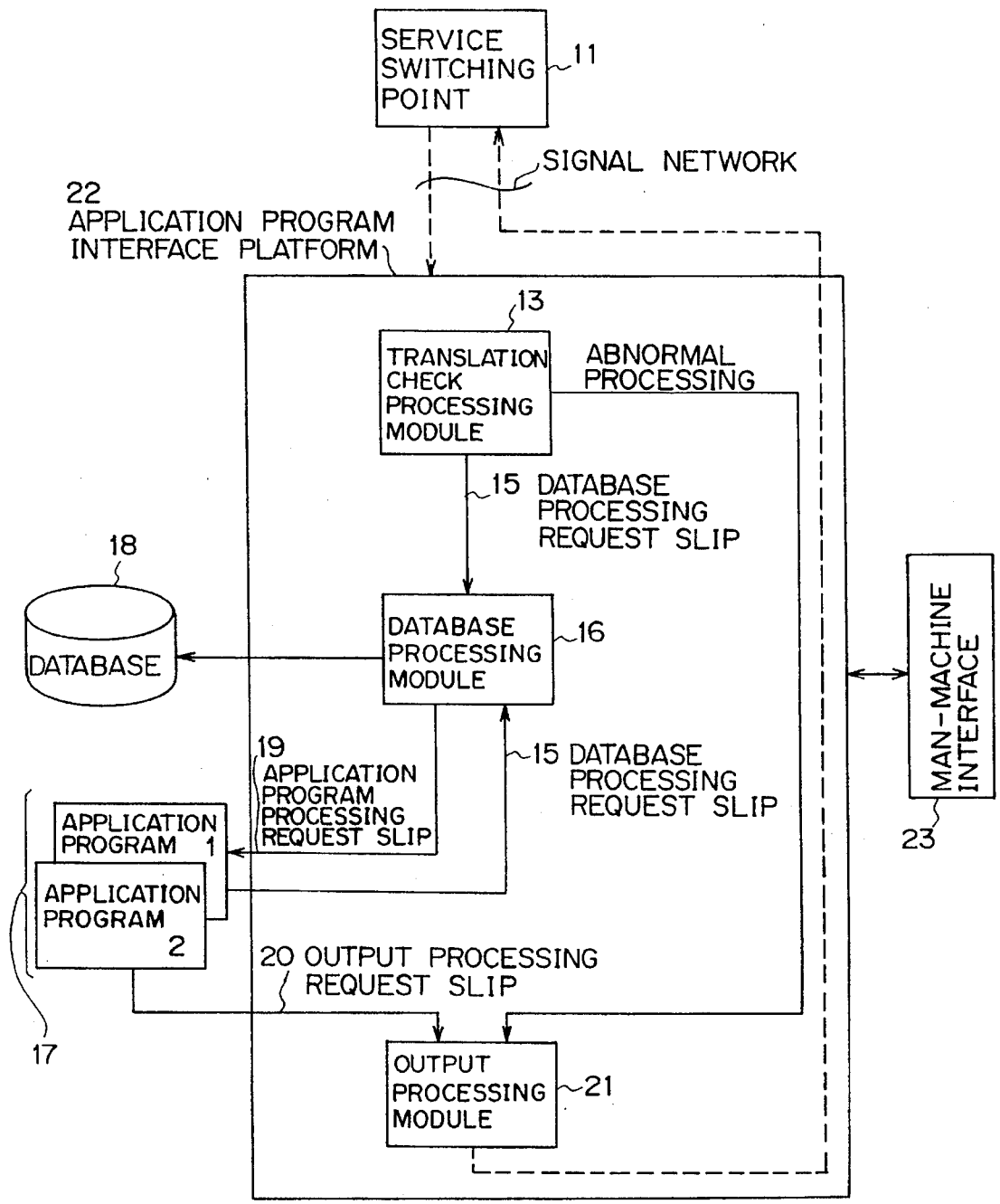
FIG. 2 shows the configuration of the preferred embodiment of this invention.

FIG. 2 shows the configuration of the main part of the service control point.

In the present embodiment, a common (Application Interface Platform) 22 is provided between database 18 and a plurality of application programs 17. Access to database 18 from respective application programs 17 is performed through a common data format by the application interface platform 22.

In accordance with it, though discribed in detail later, when the database is accessed by one of the application programs 17, only a processing request for accessing the database with regard to application interface platform 22 based on the predetermined data format is required. Therefore, a developer of an application program 17 can develop a program without considering the structure of the database 18, and the development of the application program becomes easy.

As shown in FIG. 2, the application interface platform 22 comprises a translation-check processing module 13, a database processing module 16 and an output processing module 21.

In FIG. 2, the translation-check processing module 13 analyzes a message received from an originating subscriber supplied through a service switching point 11 and determines the service to be executed. Then, if the originating subscriber requests a plurality of services, the translation-check processing module 13 judges whether all or only some of the requested services can be executed concurrently by referring to a mutual restriction-matrix table 14, to be described later.

When the service or services to be executed are determined, by adding a processing tag corresponding to the service content, the translation-check processing module 13 creates a database-processing request slip 15, to be described later, and sends it to a database-processing module ! 6.

The database-processing module 16 reads or writes data by accessing a particular database 18 according to the processing tag of the database-processing request slip 15 from the translation-check processing module 13 or an application program 17, to be described later. The database-processing module 16 also creates an application-program-processing request slip 19, to be described later, based on the data processed in accordance with the processing tag of the database-processing request slip 15.

The application program 17 executes to process various services such as closed-user groups, three-way conversations, or reverse charging. After the respective services have been processed, the application program 17 creates the database-processing request slip 15 and updates the database 18. Also, the application program 17 creates an output-processing request slip 20, to be described later, based on the processing result, and outputs it to an output-processing module 21.

The output-processing module 21 converts the data received as the output-processing-request slip 20 to a predetermined data format based on a protocol defined in a signal network.

A man-machine interface (MMI) 23 for inputting commands for expanding the functions of each module when a service is added is connected to the application program interface platform 22.

Next, the operations of this embodiment are explained.

The following describes a case in which a subscriber requests two services, closed-user-group and collect calls, at the same time.

Figure 3:
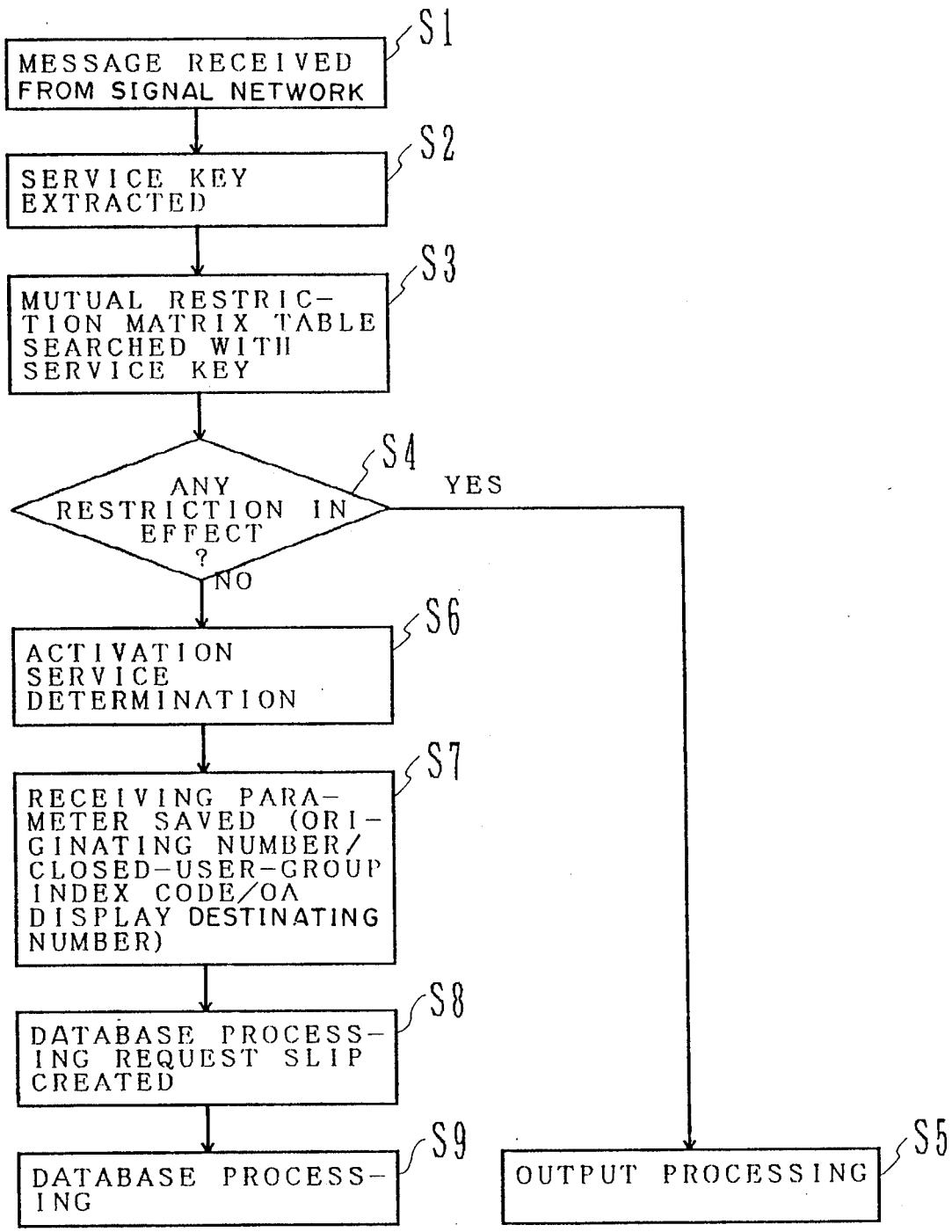
FIG. 3 is a flowchart of the translation-check process.

FIG. 3 is a flowchart of the translation-check process in the translation-check processing module 13.

First, a message is received from an originating subscriber (Step 1 in FIG. 3).

Second, a service key is extracted from the received message (Step 2 in FIG. 3).

Third, the mutual-restriction-matrix-table 14 (FIG. 4) is searched with the extracted service key (Step 3 in FIG. 3), and it is judged whether or not a mutually restricting condition exists between the two services (Step 4 in FIG. 3).

As shown in FIG. 4, the mutual restriction matrix table 14 describes the service names A through F on the horizontal and vertical axes and defines the mutual restriction condition between the respective services in a matrix form.

In FIG. 4, "O", described as the point where A and B services interact, indicates that there is no mutual restriction between both services. "pA", described as the point where A and E services interact, indicates that the execution of A service is prioritized and E service is ignored when A and E services are requested simultaneously. Other mutually restrictive conditions between respective services are predetermined according to the various mutually restrictive conditions shown in FIG. 4.

Back in FIG. 3, if it turns out that the two requested services cannot be contemporaneously activated as a result of the judging made in Step 3, the output processing module 21 is notified of the result. A message is then sent to the originating subscriber that the requested services cannot both be utilized (Step 5 in FIG. 3).

If it turns out that the two requested services do not conflict with each other, both services are activated (Step 6 in FIG. 3). The receiving parameter, service key, originating number, index code, OA display, destination number related to the CUG (closed-user-group) and reverse charging request, are saved in a memory (not shown in the drawing) (Step 7 in FIG. 3).

Further, the corresponding processing tag is added to the service key, and the database-processing request slip 15 related to the closed-user-group and the reverse charging is created (Step 8 in FIG. 3).

In the present embodiment, the processing requests between respective modules or between a module and the application program 17 are made in a common data format.

Processing requests to the database-processing module 16, the application program 17, and the output processing module 21 are made by the database-processing request slip 15, the application-program-processing request slip 19, and the output-processing request slip 20, respectively. These processing-request slips are stored in a memory at the service control point 12.

FIG. 5 shows an example of the database-processing request slip 15 related to the closed-user-group service created in the translation-check-processing module 13.

In this case, since the service key is "closed-user-group", the translation-check-processing module 13 designates a relay conversion as the processing tag Then the service key "closed-user-group", the originating number and the closed-user-group index are designated as the first, second and third parameters, respectively, so that the database-processing-request slip 15 shown in FIG. 5 is created. As for general purpose parameter of database-processing request slip, there are transmitting day and time, password, routing numbers in public network, encounting numbers for line busy, subscriber calling numbers, booking numbers and ISDN Feature Activation numbers.

The processing tag herein contains information designating the processing to be executed. As shown in FIG. 6, it is defined in correspondence with the respective service functions.

In FIG. 6, for instance, in case of a closed-user-group check processing wherewith information B is obtained from information A and information C corresponding to information B is obtained, a relay conversion is designated as the processing tag. In case of a password check for examining the conformance between information A and information B, a check is designated as the processing tag.

Processing tags for other services shown in FIG. 6 are designated according to the functions performed by the services.

When the database-processing-request slip 15 is thus created, a database processing is executed in the database-processing module 16 (Step 9 in FIG. 3).

Figure 7:
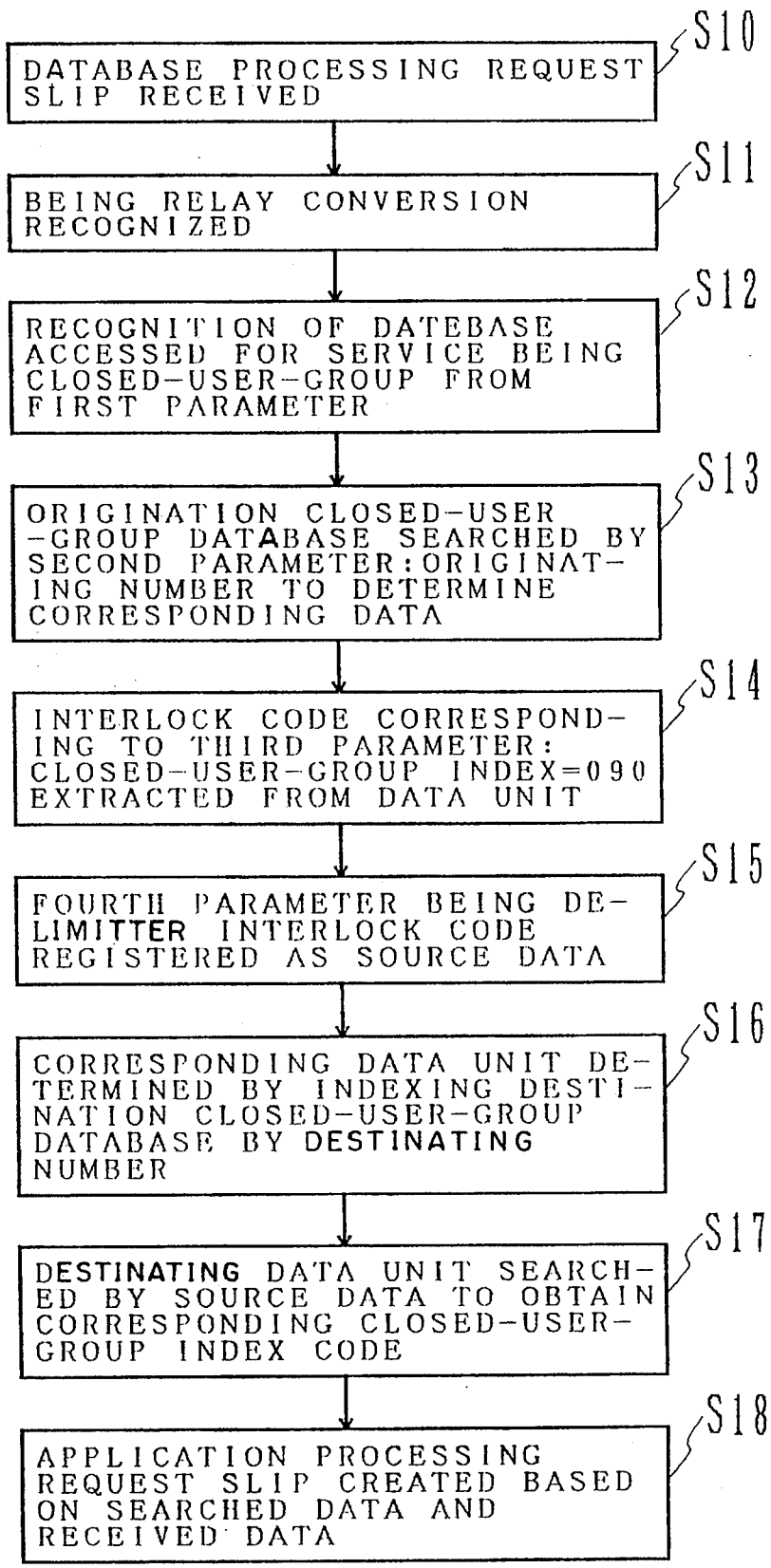
FIG. 7 is a flowchart of the database processing, FIGS. 8A through 8D explain a closed-user-group-related database processing.

FIG. 7 is a more detailed flowchart of the database processing performed in Step 9. It shows the case in which the database-processing-request slip 15 related to a closed-user-group service is received.

The closed-user-group service is offered only to certain registered subscribers, who have an individual index code assigned. If an interlock code defined in correspondence with the index code is registered in the closed-user-group database of the receiver or destination, the closed-user-group service is provided.

Upon receiving the database-processing-request slip 15 (e.g. the database-processing-request slip for closed-user-group service shown in FIG. 5) from the translation-check-processing module 13 (Step 10 in FIG. 7), the database-processing module 16 recognizes from the processing tag that the processing to be executed is a relay conversion (Step 11 in FIG. 7). It then recognizes from the service key of the first parameter of the database-processing-request slip 15 that the database to be accessed is a closed-user- group database (Step 12 in FIG. 7).

FIGS. 8A through 8D show an example of an originating-side closed-user-group database and a destination-side closed-user-group database. These figures explain the process of accessing a database after Step 13 in FIG. 7.

First, the originating-side closed-user-group database 24 is searched by the originating number of the second parameter so that the corresponding data unit 25 (FIG. 8A) is determined (Step 13 in FIG. 7). Second, the interlock code corresponding to the closed-user-group index code of the third parameter is extracted from the data unit 25 (Step 14 in FIG. 7). Since the fourth parameter is a delimiter indicating a section, the extracted interlock code is registered as source data (Step 15 in FIG. 7). Third, a corresponding data unit 27 (FIG. 8C) is determined by searching the destination-side closed-user-group database 26 with the destination number (Step 16 in FIG. 7). Fourth, the data unit 27 is searched by source data, i.e. the interlock code, and the corresponding destination-side index code is obtained (Step 17 in FIG. 7).

The application-program-processing-request slip 19 is created from the received message (information such as originating number and destination number received as a part of the database processing request slip) and the index code (searching data) thus obtained (Step 18 in FIG. 7). For instance, if the the database-processing-request slip 15 is as shown in FIG. 5, the data unit 25 shown in FIG. 8A is determined from the originating number "7126666" of the second parameter. Then, from the index code "090" of the third parameter, the interlock code "12345" is designated in correspondence with the index code "090" in the data unit 25, as shown in FIG. 8B.

Next, to determine whether or not this interlock code is registered in the destination to be accessed, the data unit 27 of the destination side CUG database 26 is determined from the destiniation number "7125555" of the fifth parameter, as shown in FIG. 8C. It is then searched by the interlock code "12345" to obtain the corresponding destination-side index code "010", as shown in FIG. 8D.

That is, in the above processing, the index code assigned to each user is converted once to the interlock code registered in the originating-side closed-user-group database 24. Then, from the destiniation number and its interlock code, it is checked whether or not the CUG user registration has already been made by determining whether or not the interlock code actually exists in the destination side CUG database 26.

If the final destination side index code is obtained, the application program processing request slip 19 is created from the index code and the received message.

FIG. 9 shows an example of an AP processing request slip 19 created by the above-described DB processing.

The application-program-processing-request slip 19 shown in FIG. 9 is created based on the closed-user-group-related database-processing-request slip 15 shown in FIG. 5.

In FIG. 9, the head of the application-program-processing- request slip 19 memorizes the "closed-user-group" as the program number designating the application program 17 to be executed. The destination side index code "010" and the interlock code "090" obtained from the database processing are memorized, together with the originating number and the destination number.

Figure 10:
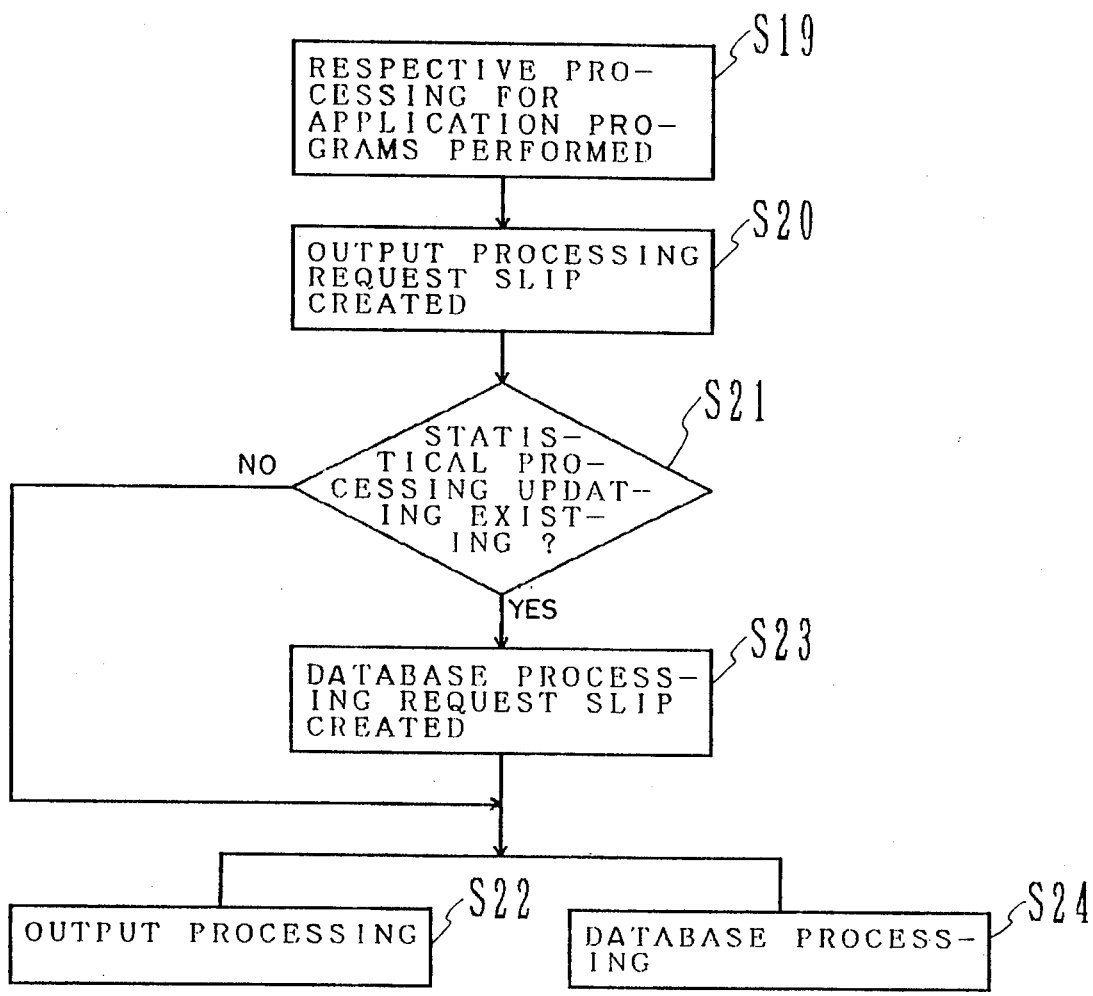
FIG. 10 is a flowchart of the interface processings in an application program.

Next, the processing on the side of the application program (AP) 17 upon receiving the application program processing request slip 19 is explained by referring to the flowchart of FIG. 10. This explanation only pertains to the processing of the interface between the application program 17 and the output-processing module 21 or the database-processing module 16.

First, the respective processing of the application program 17 is designated by the program number of the application-program-processing-request slip 19 (Step 19 in FIG. 10).

Second, the output-processing-request slip 20 is created based on tile data obtained from this processing (Step 20 in FIG. 10).

FIG. 11 shows an example of the output-processing-request slip 20. The output-processing-request slip 20 shown in FIG. 11 is created based on the closed-user-group-related application-program-processing-request slip 19 shown in FIG. 9. In FIG. 11, a processing tag indicating a processing request related to a sending is added to the head of the output-processing-request slip 20, and the destination number "7125555" on the destination side and the destination side index code "010" are memorized as the first and second parameters, respectively.

In FIG. 10, it is judged whether or not statistical information of the database 18 needs to be updated (Step 21 in FIG. 10). If it does not, the processing goes on to either Step 22 or Step 24 shown in FIG. 10, and the created output-processing-request slip 20 is outputted to the output-processing module 21, or the database-processing-request slip 15 created by the respective application program processing is outputted to the database-processing module 16. The output processing in Step 22 is executed by the output-processing module 21, and it is recognized from the processing tag of the output-processing-request slip 20 that it is a sending processing. Succeeding information is then converted to the predetermined format according to the predetermined protocol of the signal network to which the reformatted information is outputted.

However, if it is necessary to update the statistical information, the database-processing-request request slip 15 is created for updating the statistical information (Step 23 in FIG. 10 ). Database processing is then activated by outputting the created database-processing-request slip 15 to the database-processing module 16 ( Step 24 in FIG. 10 ).

FIGS. 12A and 12B show an example of the database-processing-request slip 15 when the number of times the closed-user-group database is accessed is sorted by the originating number or the interlock code. In this case, the processing tag for designating the updating processing is added to the head of the respective database-processing-request slip Also in this case, "closed-user-group statistics", "addition" and "1" are memorized as information indicating the database type of the first parameter, the operation content of the fourth parameter and the operation unit of the fifth parameter, respectively.

When the database-processing module 16 receives the database-processing-request slip 15 shown in FIGS. 12A and 12B, updating of the statistical information related to the closed-user-group statistical database is recognized from the processing tag and the database type.

Figure 13:
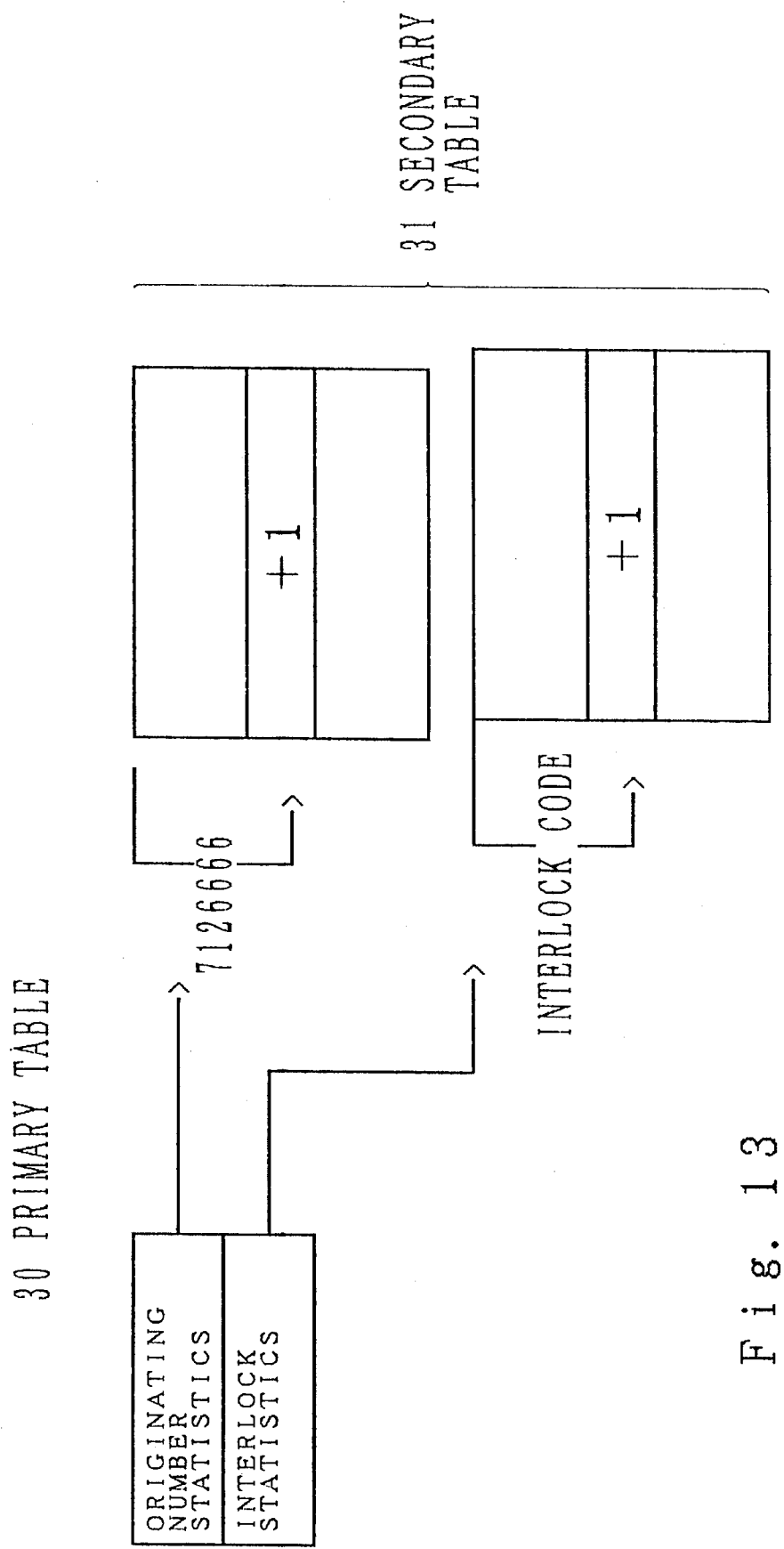
FIG. 13 shows the configuration of a closed-user-group statistical database.

The primary table 30 and the secondary table 31 of the database that memorizes the closed-user-group statistical information shown in FIG. 13 are then searched by the originating number "7126666" and the interlock code, so that the data in the corresponding areas are incremented by one to update the statistical information (the number of accessing times in this case).

As so far explained, in the above embodiment, the application program interface platform 22 is provided between the database 18 and the application program 17. The processing requests of the application-program interface platform 22 between the modules or between the module and the database 18 or between the module and the application program 17 are made in a common data format, such as in the form of a common processing request slip.

Consequently, the application program 17 can be developed without recognizing the structure of the database 18. This simplifies program development, and enables an exchange network operator to develop the application program 17 on a proprietary basis.

The check of the mutual restrictions between applications conventionally performed in the application program 17 is performed by the translation-check-processing module 13 provided inside the application program interface platform 22, so that the existing application program 17 need not be modified when a new service is added. This improves the efficiency of program development.

Next explained are the procedures for extending the functions of the translation-check-processing module 13 and the database-processing module 16 when a new service is added. This explanation assumes that the closed-user-group service does not exist and a closed-user-group service is newly added.

Figure 14:
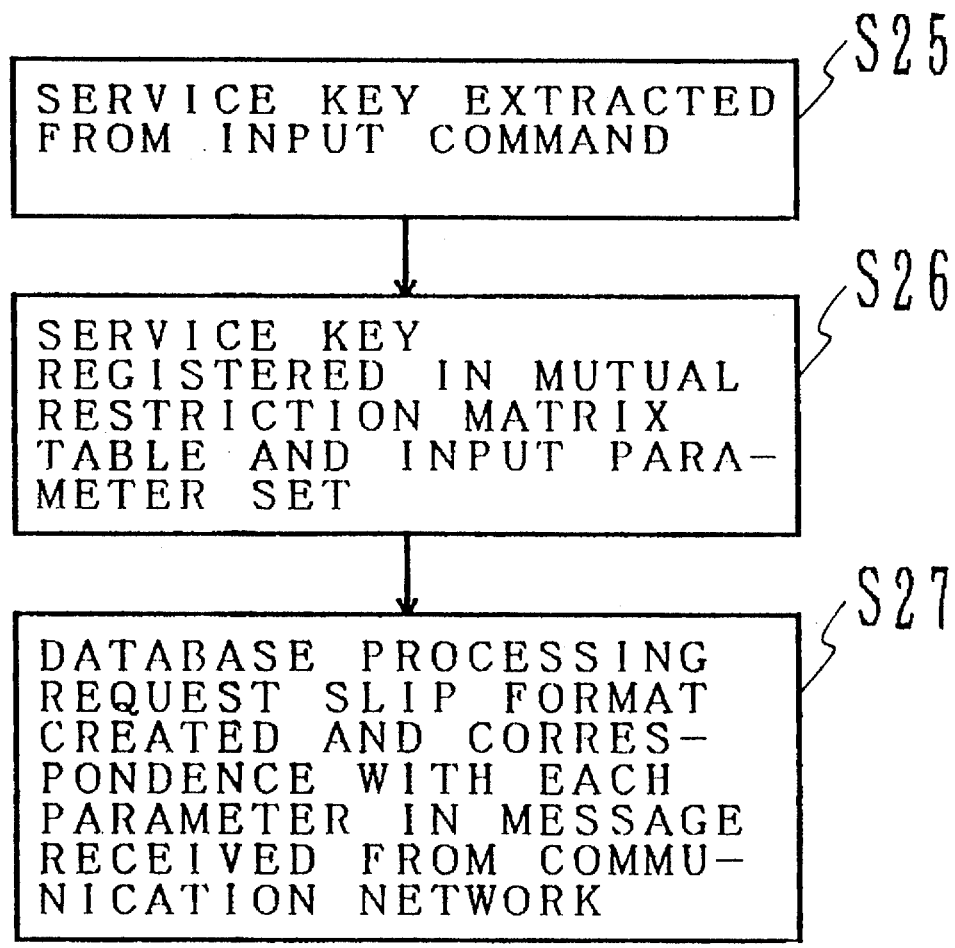
FIG. 14 is a flowchart showing the procedure for extending the functions of the translation-check processing module, FIG. 15 explains the corresponding relations between the parameters of the database-processing request slip and the received message.

First, the procedures for extending the functions of the translation-check-processing module 13 are explained by referring to the flowchart shown in FIG. 14. When the service is added, an operator (such as an exchange network operator) defines a new service key through a device such as a keyboard (not shown in the drawing) of the man-machine interface 23 (Step 25 in FIG. 14).

Second, the mutual-restriction-matrix table 14 (FIG. 4) is displayed on the display screen of the man-machine interface 23, so that a new service is registered on the mutual-restriction-matrix table 14 and a further mutual restricting condition is set (Step 26 in FIG. 14). Then, a parameter for the incoming message received from the signal network is set.

Third, the format of the database-processing-request slip 15 of the newly-added service is created on the display screen, and the respective parameters for the incoming message and the database-processing-request slip 15 are displayed on the display screen so that their corresponding relations can be defined (Step 27 in FIG. 14).

Figure 15:
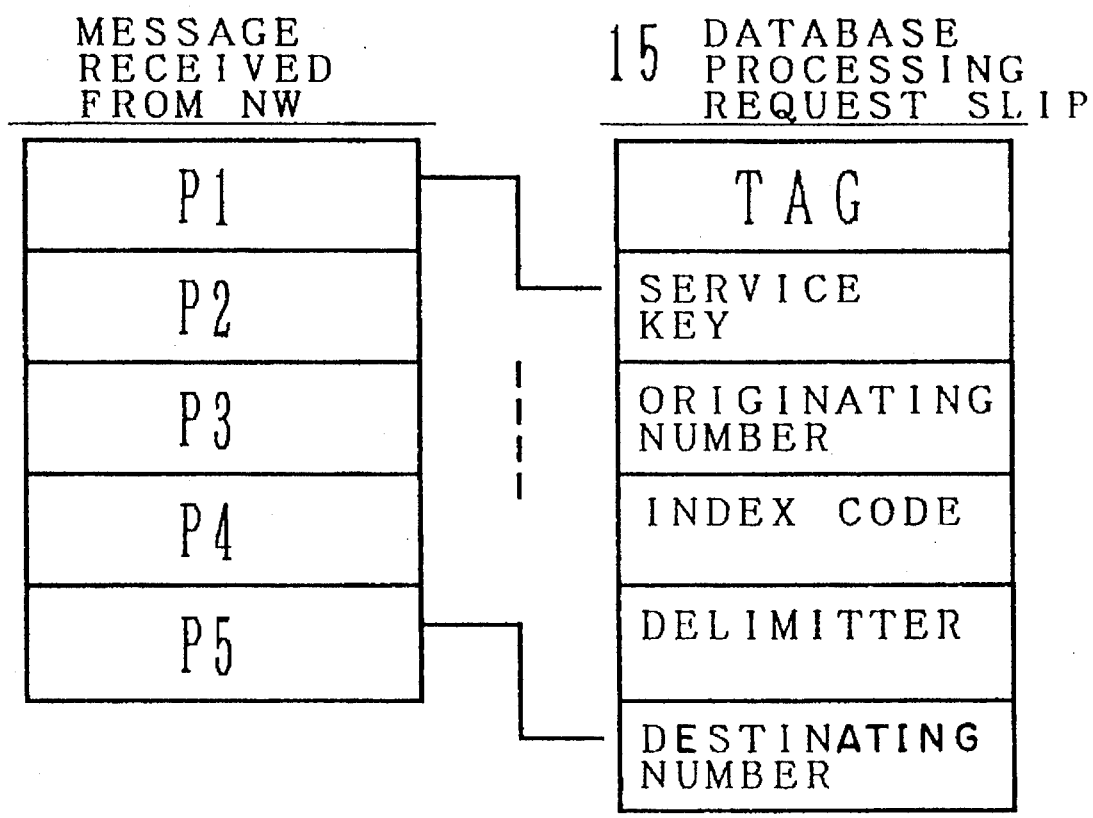

FIG. 15 shows an explanatory view of the corresponding relations between the parameters of the received message and the database-processing request slip 15. In this drawing, for instance, the parameters for the received message and the database-processing-request slip 15 are displayed on the display screen so that their correspondence relationships can be defined. Based on this definition, the translation-check-processing module 13 creates the database-processing-request slip 15 of the newly added service.

Thus, when a new service is added, only the mutual restricting conditions with already-existing services need to be set in the mutual-restriction-matrix table 14, and existing application programs need not be modified. Besides, the setting of the mutual restricting condition is greatly simplified.

Figure 16:
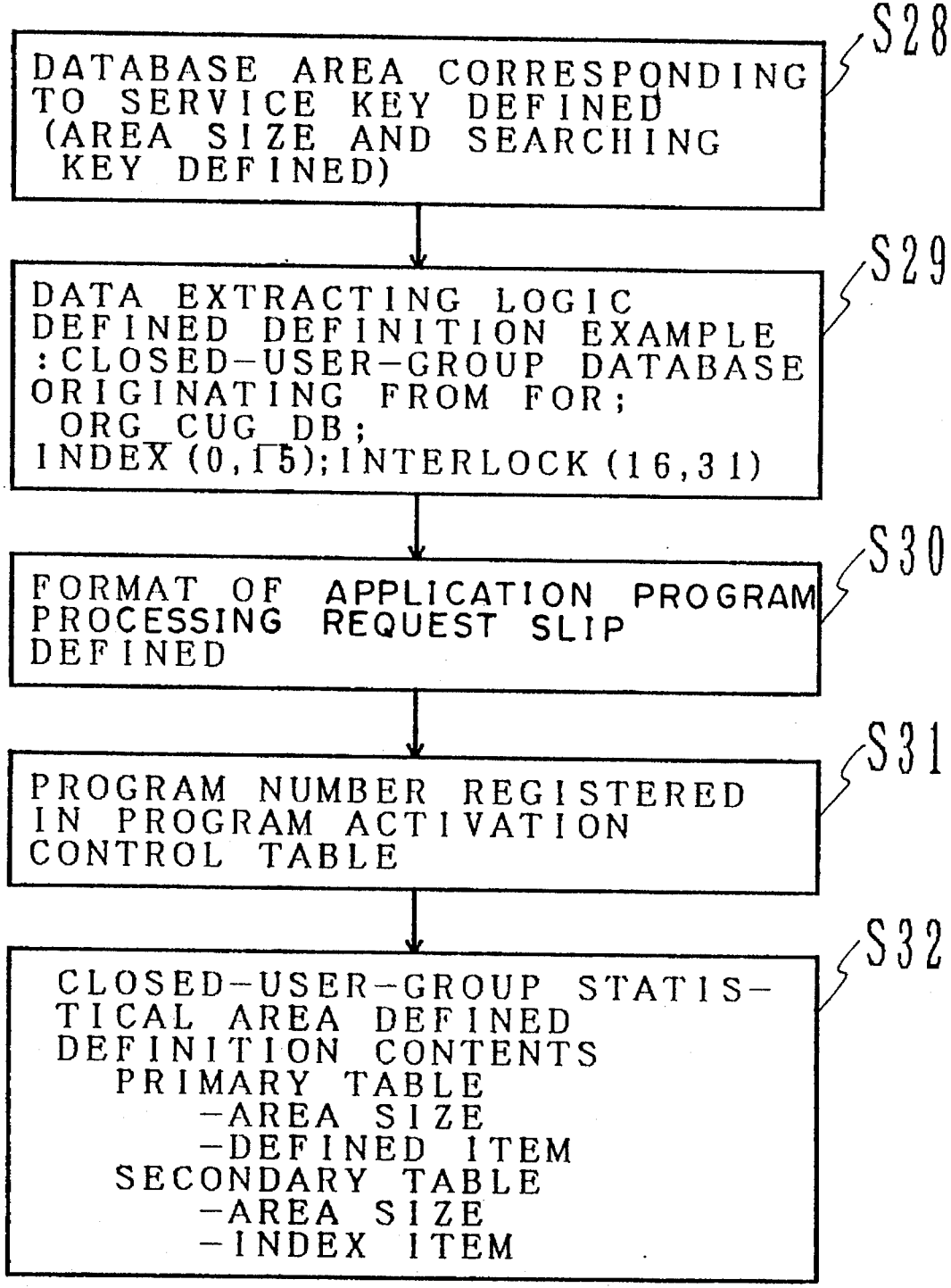
FIG. 16 is a flowchart showing the procedure for extending the functions of the database processing module.
Figure 17:
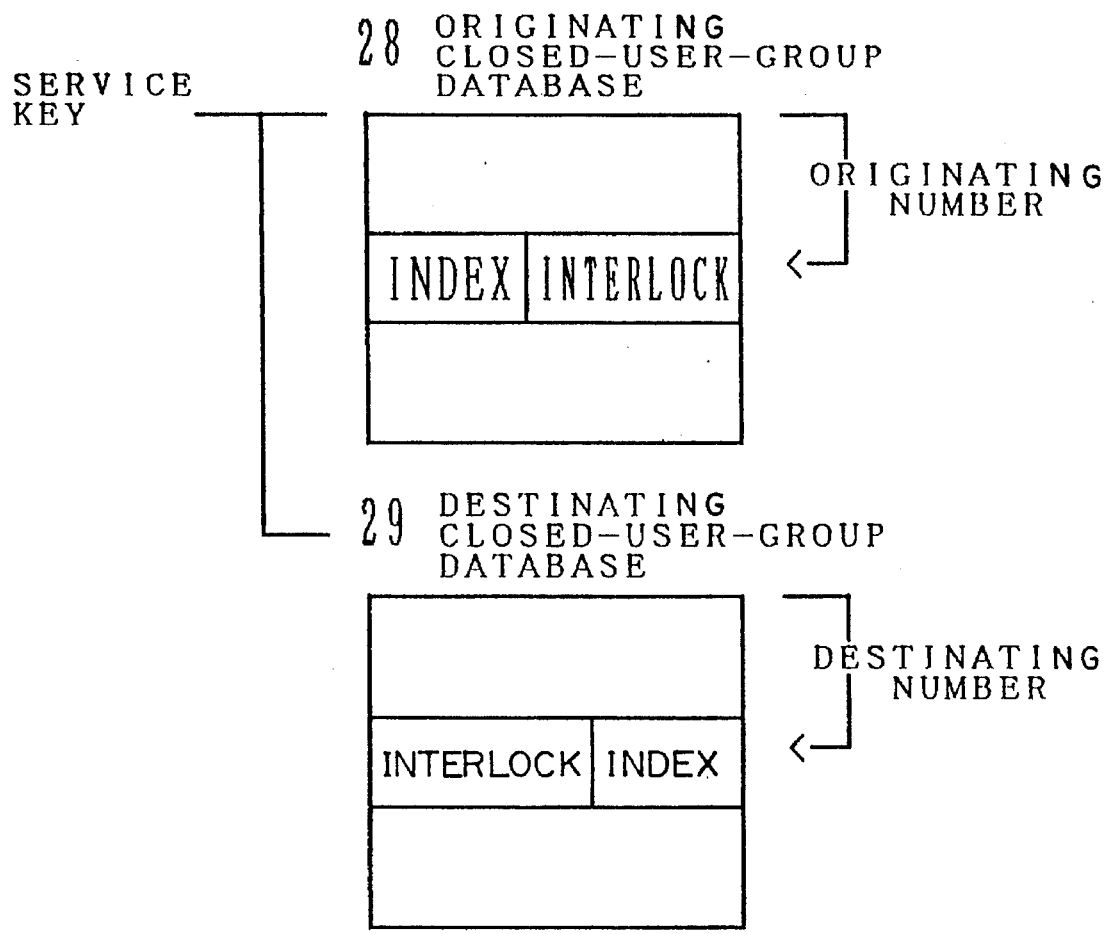
FIG. 17 shows an example of an originating-side closed-user-group database and a destination-side closed-user-group database, FIG. 18 explains the corresponding relations between the parameters of the application program processing request slip and the received message, and FIG. 19 explains the corresponding relations between the data formats outputted to the signal network and the output processing request slip.

Next, the procedure for extending the function of the database-processing module 16 when a service is added is explained by referring to the flowchart shown in FIG. 16 and the database configuration diagram of FIG. 17.

First, the maximum sizes of the originating-side closed-user-group database 28 and the destination-side closed-user-group database 29 (FIG. 17) corresponding to the defined closed-user-group service are defined (Step 28 in FIG. 16). It is then defined which code (i.e., an index code or an interlock code) is used in searching the originating-side closed-user-group database 28 and the destination-side closed-user-group database 29.

Second, the respective database configuration is defined (Step 29 in FIG. 6). An extending command such as the following can then define a new database area.

A command "ORG_CUB_DB; originating number; index (0,15); interlock (16, 31)" defines the configuration of the originating-side closed-user-group database 28, and has an index-code-data area comprising bit 0 to bit 15 and an interlock-code-data area comprising bit 16 to bit 31 in a 32-bit-long data area. This command also means that the index code and the interlock code of the individual originating subscriber or call originator is stored in the database in the order of the originating number.

A similar extending command can define the configuration of the destination-side closed-user-group database 29. This enables the areas for the originating-side closed-user-group database 28 and the destination-side closed-user-group database 29 shown in FIG. 17 to be secured.

Since the database area can be secured at a command level, the functions of each module in the application-program interface platform 22 can be easily extended when a service is added.

Figure 18:
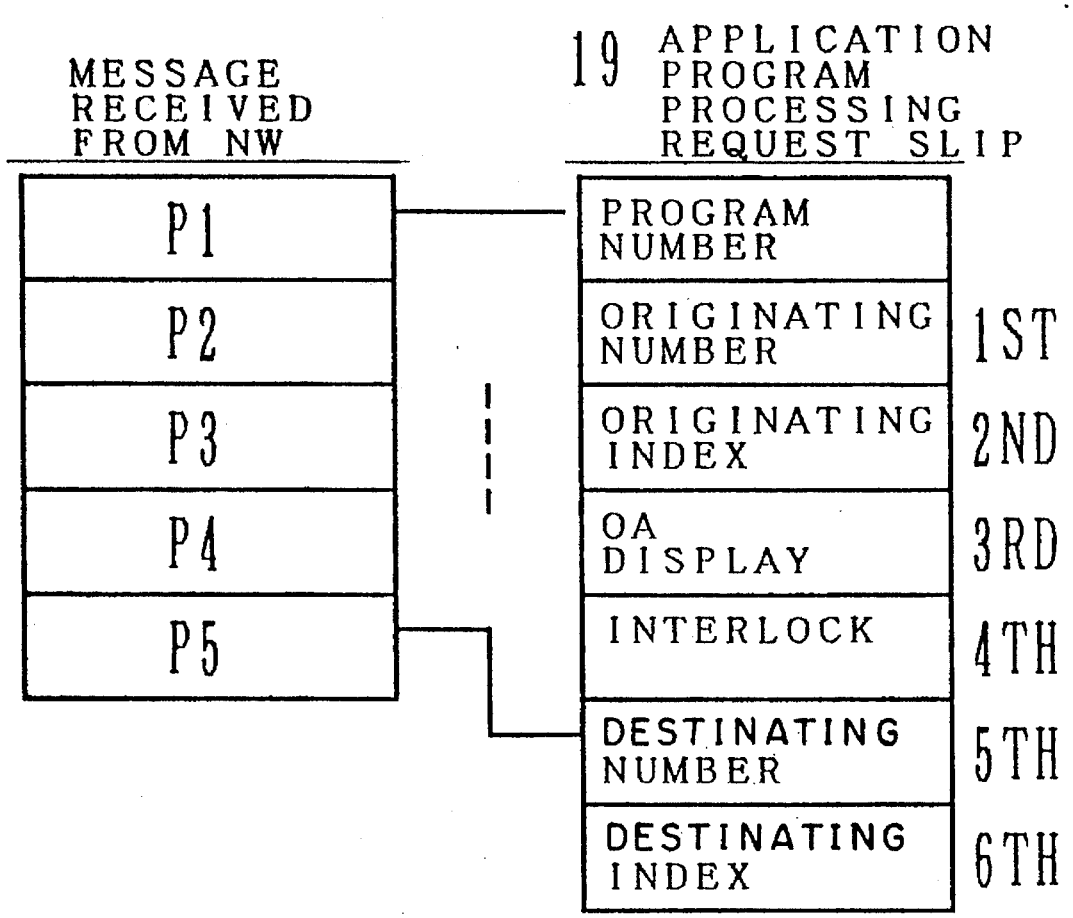

In FIG. 16, the format for the application-program-processing request slip 19 corresponding to the added service is defined (Step 30 in FIG. 18).

FIG. 18 explains the corresponding relations between the received message and the parameter of the application-program-processing request slip 19.

For instance, as shown in FIG. 18, the respective parameters for the received message and the application-program-processing request slip 19 are displayed, so that correspondence is made between them on the display screen, thereby defining the relations between the parameters.

Also, at this time, the destination index code and the interlock code obtained from a database processing are defined as data for the sixth and fourth parameters, respectively.

Further, the program number (service key) of the newly-added closed-user-group service is registered in an activation control table (not shown in the drawings) (Step 31 in FIG. 16).

The database area of the statistical information updated when a closed-user-group service is activated, is then defined (Step 32 in FIG. 16).

The processing at Step 32 first defines the item which indicates whereto the statistical information is related and its area size. Thus, as shown in FIG. 13, the primary table indicating that the statistical information of the database relates to the originating number and the interlock code is defined.

Then the area size for the secondary table 31, i.e. the area size for memorizing the statistical information for respective items and the index item are defined.

Through the above procedures, the closed-user-group statistical database area for memorizing the numbers of accessing times for the originating number and the interlock code is defined.

Next, the functions of the output processing module 21 are extended.

Figure 19:
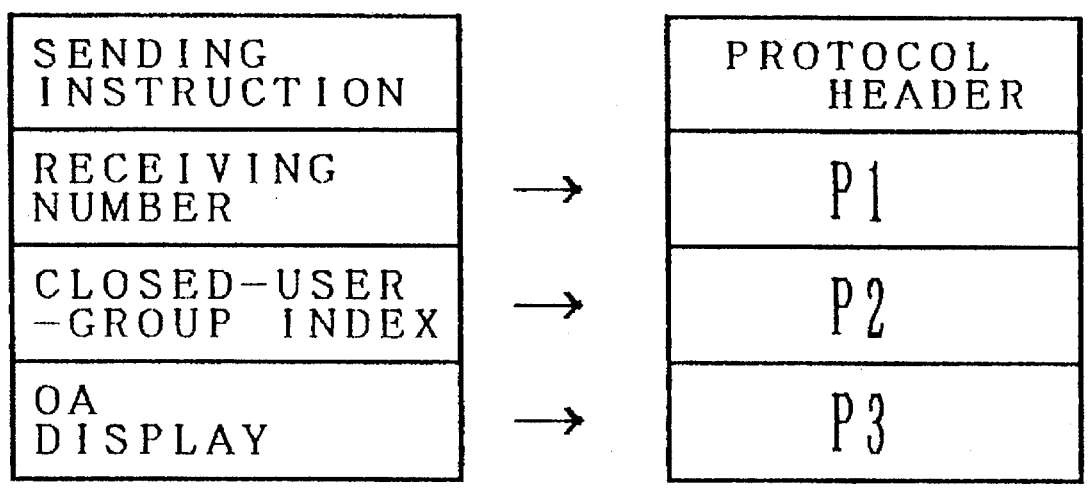

FIG. 19 explains the corresponding relations between the output processing request slip 20 defined at this time and the data format outputted to the signal network.

As shown in FIG. 19, for example, the format of the output processing request slip 20 and the data format to be outputted to the signal network are created and their corresponding relations are defined on the display screen.

This enables data sent from the service application program 17 in the form of an output-processing-request slip (in this case, the output data related to the newly-added closed-user-group service) to be outputted by having the output-processing module 21 convert them to a predetermined data format set in a signal network.

Thus, because various processing-request slips and the mutual-restriction-matrix table 14 can be defined on the man-machine interface 23, modifications necessary for adding a new service can be very easily made.

Also, since the functions of each module are extended through the command input from the man-machine interface 23, a service can be added flexibly. In the embodiment described above, APIP 22 is provided between the database and a plurality of application programs 17 and processing request command between respective modules of application program interface platform 22 and application program 17 is performed by using common data format among a plurality of application programs. Therefore, if a network operator only knows the above common format, an accessing process to database based on the common format is conducted by database processing module in APIP. Therefore, since the above embodiment enables an application program to be developed without the database structure being recognized, an exchange network operator can easily develop such a program.

Since the common module has a mutual restricting matrix for storing the mutually restrictive conditions between application programs, the existing application programs need not be modified when a new service is added.

A processing request (a database-processing-request slip, an application-program-processing-request slip, or an output-processing-request slip) created by a translation-check module, a database-processing-module, or an application program is not limited to the format stated in the description of the preferred embodiment, but may be in various formats. For example, it can be realized by a slip format without using a processing tag.

The configuration of devices utilizing the database management method of this invention is not limited to the configuration of the service control point 12 described earlier, but may be one of a variety of modified forms.

What is claimed is:

1. A system, comprising:

an intelligent telephone network performing centralized control for services provided to telephone subscribers; and a database management system, comprising:

a database storing indications of telephone services provided to subscribers;

a plurality of subscriber service application programs providing subscriber services; and a subscriber application interface platform operatively connected to provide an application interface between the database and the plurality of service application programs, said application interface platform comprising:

a translation module for requesting database processing by generating a database processing request in a common data format in response to a service request message from an originating subscriber of the intelligent telephone network;

a database module for accessing the database based on the database processing request in the common data format from said translation module, for producing an application processing request in the common data format for application processing by one of the plurality of service application programs in response to the database processing request from said translation module and for accessing the database based on a database processing request in the common data format from one of the plurality of service application programs; and an output module for sending a message to the intelligent telephone network based on an output processing request in the common data format from one of the plurality of service application programs; and wherein said application interface platform transfers the database processing, the application processing and the output processing requests between said translation, database and output modules or between one of said translation, database and output modules and the plurality of subscriber service application programs in the common data format.

2. The database management system in an intelligent telephone network according to claim 14, wherein said translation module comprises means for creating a database processing request slip in a predetermined format added with a processing tag designating the processing in correspondence with the service request message from the originating subscriber; and wherein said database module comprises means for reading or writing data by accessing the appropriate database in response to the database processing request slip to identify the one of the plurality of service applications to be performed and to identify the database to be accessed by the one of the plurality of service application programming, for creating an application processing request slip in the predetermined format from the information obtained from the database and for requesting application processing by the plurality of service application programs using the application processing request slip.

3. The database management system in an intelligent telephone network according to claim 2, wherein said translation module comprises means for creating the database processing request slip comprising information on a requested service and parameters of a processing tag for designating the process, a source number and destination number.

4. The database management system in an intelligent telephone network according to claim 3, wherein a closed user group is requested by the originating subscriber, and wherein said translation module further comprises means for creating the processing tag comprising information designating a relay conversion process for accessing the closed user group database to read the corresponding information from the information given by the originating subscriber.

5. The database management system in an intelligent telephone network according to claim 3, wherein said database module comprises means for recognizing a process to be executed by a process tag of the database process request slip transmitted from the service application program and for accessing the object database information designating the service, the source number, identification code given to the originating subscriber and the destination number.

6. The database management system in an intelligent telephone network according to claim 1, wherein said translation module comprises a mutual restriction matrix table for defining the mutual restriction conditions between service application programs including priority of execution and simultaneous access denial; and wherein said database module comprises means for judging the possibility of simultaneous execution and priority of execution when an originating subscriber requests simultaneous execution of a plurality of services by referring to said mutual restriction matrix table.

7. The database management system in an intelligent telephone network according to claim 1, wherein said translation module comprises a mutual restriction matrix table for defining mutual restriction conditions between service application programs including priority of execution and simultaneous access denial; and wherein said database module comprises means for judging the possibility of simultaneous execution and priority of execution when a plurality of originating subscribers request simultaneous execution of a plurality of services by referring to said mutual restriction matrix table.

8. The database management system in an intelligent telephone network according to claim 1, wherein said database module comprises means for causing said service application program to create a database processing request slip or an output processing request slip and request processing of said database module or of said output module based on the result of execution of at least one of the service application programs.

9. A system according to claim 1:

wherein said intelligent telephone network comprises a service switching point for controlling connection of subscriber lines;

wherein said translation module comprises means for requesting database processing by generating the database processing request in the common data format in response to the service request message from the originating subscriber through said service switching point; and wherein said output module comprises means for sending the message to said service switching point to control connection of subscriber lines based on the output processing request in the common data format from one of the plurality of service application programs.

10. A database management system in an intelligent telephone network, comprising:

a database storing indications of telephone services provided to subscribers;

a plurality of subscriber service application programs providing subscriber services; and a subscriber application interface platform coupled between said application programs and said database, said platform comprising:

a translation module for requesting database processing by generating a database processing request in a common data format in response to a service request message from an originating subscriber over the network;

a database processing module for accessing the database based on the database processing request in the common data format from said translation module, for producing an application processing request in the common data format requesting application processing by one of the plurality of service application programs in response to the database processing request from said translation module and for accessing the database based on a database processing request in the common data format from one of the plurality of service application programs;

an output processing module for sending a message to the intelligent telephone network based on an output processing request in the common data format from one of the plurality of service application programs; and a man-machine interface including a display screen; and wherein said database management system has a mutual restriction matrix table for defining mutually restrictive conditions between existing services provided by service application programs provided in said translation module by display on the display screen of said man-machine interface when a new subscriber service is added to define the mutually restrictive conditions between any of existing services of the existing service application programs and a newly registered service registered to the matrix table on the display screen.

11. The database management system in an intelligent telephone network according to claim 10, wherein said translation module comprises means for creating a database processing request slip in a predetermined format together with a processing tag designating processing corresponding to the service request from the originating subscriber and for requesting processing by the database processing module; and wherein said database processing module comprises means for reading or writing data by accessing the appropriate database based on the database processing request slip to identify the one of the plurality of application programs to be performed and to identify the database to be accessed by the one of the plurality of service application programs, for creating an application processing request slip in the predetermined format from the received message information and information obtained from the database and for requesting processing by one of the plurality of the service application programs.

12. The database management system in an intelligent telephone network according to claim 11, wherein said database processing module comprises means for formatting database processing requests which correspond to the added new service, the application processing request and the output processing request being displayed on the display screen when the new service is added; and wherein said display screen displays definitions of each parameter of the service request message received from the network, a correspondence between each parameter of the created database processing request and each parameter of the application processing request, and a correspondence between each parameter of the created output processing request and each parameter of the message sent to the network.

13. The database management system in an intelligent telephone network according to claim 10, wherein said database processing module comprises means for formatting database processing requests which correspond to the added new service, the application processing request and the output processing request being displayed on the display screen when the new service is added; and wherein said display screen displays definitions of each parameter of the service request message received from the network, a correspondence between each parameter of the database processing request and each parameter of the application processing request, and a correspondence between each parameter of the output processing request and each parameter of the message sent to the network.

14. A database management system in an intelligent telephone network, said intelligent telephone network comprising a service control point coupled by a signal network to a service switching point, said intelligent telephone network performing centralized control for services provided for telephone subscribers, said database management system in said service control point comprising:

a database storing indications of telephone services provided to subscribers;

a plurality of subscriber service application programs controlling subscriber services responsive to an application processing request producing a database processing request and producing an output processing request; and an application interface platform operatively connected to provide an application interface between the database and the plurality of service application programs, said application interface platform comprising:

a translation module for requesting database processing by generating a database processing request in a common data format in response to a service request message from an originating subscriber communicated through said service switching point;

a database module for accessing the database based on the database processing request in the common data format from said translation module, for accessing the database based on the database processing request from one of the plurality of service application programs, and for producing the application processing request in the common data format for application processing by one of plurality of service application programs; and an output module for sending a message to said service switching point to control connection of subscriber lines based on the output processing request in the common data format from one of the plurality of service application programs.

15. A system for providing telephone services to subscribers responsive to a service request, comprising:

a telephone network;

first and second service switching systems of the telephone network providing the telephone services to subscribers and performing subscriber service operations responsive to service control commands in corresponding first and second service system formats; and a service center connected to said switching systems over said network and comprising:

a database storing types of services provided to each of the subscribers;

first and second application processing systems including first and second application programs controlling the telephone services provided to the subscriber by producing the service control commands; and an interface system coupled to said service switching systems, said database and said application processing systems, said interface system comprising:

a translation module receiving the service request, determining the service to be performed, determining whether the service is restricted as being mutually exclusive of another service currently being provided and producing a database processing request in a common format for updating the type of service being provided to the subscriber;

a database processing module receiving the database request, updating the database to indicate the first telephone service is being provided to the subscriber, determining which of the first and second application processing systems controls the service of the service request, preparing an application service request in the common format responsive to the determination and sending the application service request to one of the first and second application processing systems responsive to the determination, the one of the first and second application processing systems producing the service control command in the common format responsive to the application service request; and an output processing module converting the switch control command into the corresponding service system format and sending the service control command to said corresponding service switching system.

16. A system providing telephone services to subscribers responsive to a subscriber service request, comprising:

first and second switching centers of a telephone network responding to service control commands having respective first and second formats to provide the telephone services to the subscribers; and a service center coupled to said switching centers, comprising:

a database storing and outputing data indicating the telephone services being provided to the subscribers responsive database commands in a database command format;

application systems including service application programs controlling the telephone services responsive to application service commands in respective application formats and producing application control commands in the application formats; and an interface system including a common command format for internal communication and producing the database commands responsive to the service requests and converting the service requests into the application service commands and converting the application control commands into the service control commands.

17. A system as recited in claim 16, wherein said interface system determines whether a service of the subscriber service requests can be provided based on services currently being provided.

* * * * *

UNITED STATES PATENT AND TRADEMARK OFFICE
CERTIFICATE OF CORRECTION

PATENT NO. : 5,574,904
DATED : November 12, 1996
INVENTOR(S) : Hideo YUNOKI, et al.

It is certified that error appears in the above-indentified patent and that said Letters Patent is hereby corrected as shown below:

TITLE PAGE [54] and column 1, line 1,

"DATABASE MANAGEMENT SYSTEM IN AN INTELLIGENT NETWORK USING A COMMON REQUEST DATA FORMAT" should be --

--DATABASE MANAGEMENT SYSTEM IN AN INTELLIGENT TELEPHONE NETWORK USING A COMMON REQUEST DATA FORMAT--.

Column 1
   Line 34, "device" should be --service--.

Column 2
   Line 37, "tile" should be --the--.

Column 3
   Line 40, delete "(service control point)";
   Lines 48 and 49, "(Application Interface Platform)" should be --Application Interface Platform--.

Column 4
   Line 14, "!6." should be --16--.

UNITED STATES PATENT AND TRADEMARK OFFICE
CERTIFICATE OF CORRECTION

PATENT NO. : 5,574,904
DATED : November 12, 1996
INVENTOR(S) : Hideo YUNOKI, et al.

It is certified that error appears in the above-indentified patent and that said Letters Patent is hereby corrected as shown below:

<u>Column 7</u>

Line 22, "tile" should be --the--.

Signed and Sealed this

Twenty-fourth Day of June, 1997

Attest:

BRUCE LEHMAN

*Attesting Officer*  *Commissioner of Patents and Trademarks*